(12) United States Patent
Krampotich et al.

(10) Patent No.: US 8,155,494 B2
(45) Date of Patent: *Apr. 10, 2012

(54) UNIVERSAL CABLE MANAGEMENT PANEL

(75) Inventors: Dennis Krampotich, Shakopee, MN (US); Ryan Kostecka, Burnsville, MN (US); Anthony Szczodroski, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/803,619

(22) Filed: Jun. 29, 2010

(65) Prior Publication Data
US 2010/0316346 A1    Dec. 16, 2010

Related U.S. Application Data

(63) Continuation of application No. 12/381,160, filed on Mar. 6, 2009, now Pat. No. 7,764,859.

(60) Provisional application No. 61/072,184, filed on Mar. 28, 2008, provisional application No. 61/126,672, filed on May 5, 2008.

(51) Int. Cl.
*G02B 6/00* (2006.01)
(52) U.S. Cl. .................................... 385/135
(58) Field of Classification Search ............... 385/135
See application file for complete search history.

(56) References Cited

U.S. PATENT DOCUMENTS

| | | | |
|---|---|---|---|
| 4,824,196 A * | 4/1989 | Bylander | 385/134 |
| 4,971,421 A | 11/1990 | Ori | |
| 5,363,467 A | 11/1994 | Keith | |
| 5,490,229 A | 2/1996 | Ghandeharizadeh et al. | |
| 5,497,444 A | 3/1996 | Wheeler | |
| 6,438,310 B1 | 8/2002 | Lance et al. | |
| 6,504,988 B1 | 1/2003 | Trebesch et al. | |
| 6,804,447 B2 | 10/2004 | Smith et al. | |
| 6,937,807 B2 * | 8/2005 | Franklin et al. | 385/134 |
| 6,944,389 B2 * | 9/2005 | Giraud et al. | 385/135 |
| 7,079,744 B2 | 7/2006 | Douglas et al. | |
| 7,171,099 B2 | 1/2007 | Barnes et al. | |
| 7,493,002 B2 | 2/2009 | Coburn et al. | |
| 7,764,859 B2 | 7/2010 | Krampotich et al. | |
| 2007/0031099 A1 | 2/2007 | Herzog et al. | |
| 2008/0085092 A1 | 4/2008 | Barnes | |

FOREIGN PATENT DOCUMENTS

EP    0 341 027 A2    11/1989

OTHER PUBLICATIONS

U.S. Appl. No. 61/072,148, filed Mar. 28, 2008; Krampotich; 19 pages.
U.S. Appl. No. 61/072,186, filed Mar. 28, 2008; Krampotich; 38 pages.
U.S. Appl. No. 12/381,159, filed Mar. 6, 2009; Krampotich et al.
U.S. Appl. No. 12/381,162, filed Mar. 6, 2009; Krampotich et al.

* cited by examiner

*Primary Examiner* — Omar Rojas
(74) *Attorney, Agent, or Firm* — Merchant & Gould P.C.

(57) ABSTRACT

A cable management panel including a chassis and a drawer. The chassis defining rear and side openings for cable entry and exit. The drawer having a front panel that may include angled adapters. The drawer having an open rear that accommodates cables entering from the rear openings of the chassis, and that accommodates the addition of a rear wall. The cable management panel being adaptable to provide a variety of cable routing configurations to accommodate a user's particular cable routing needs.

15 Claims, 14 Drawing Sheets

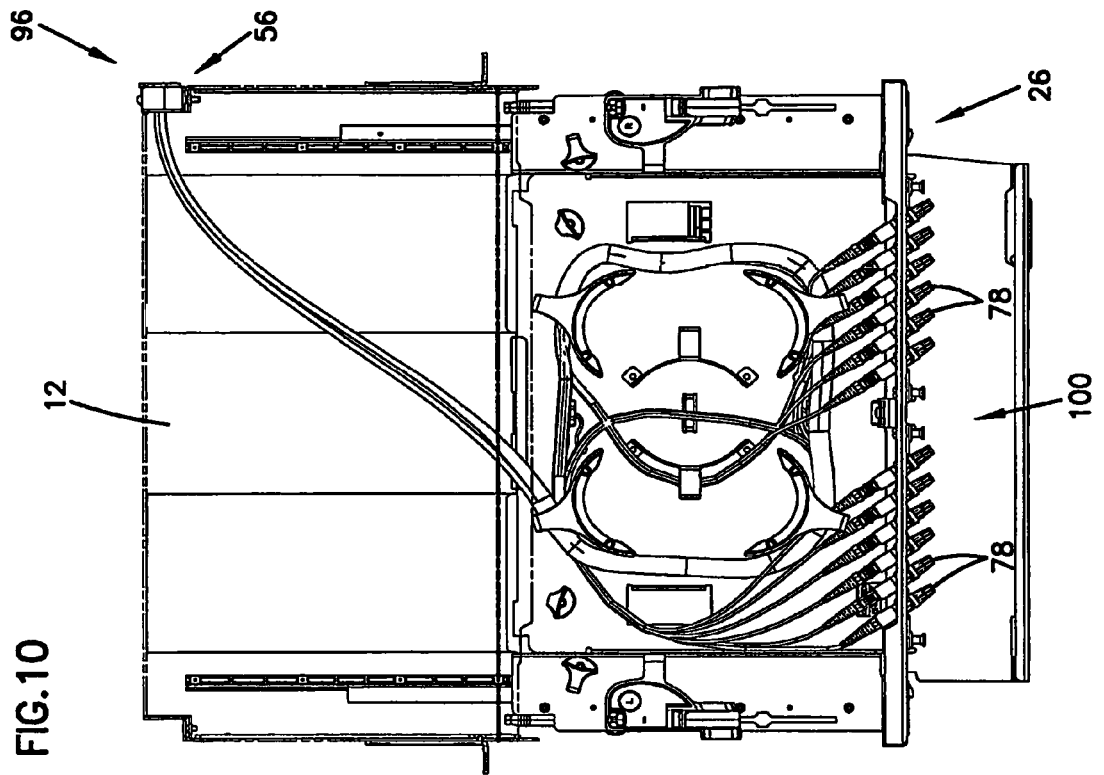
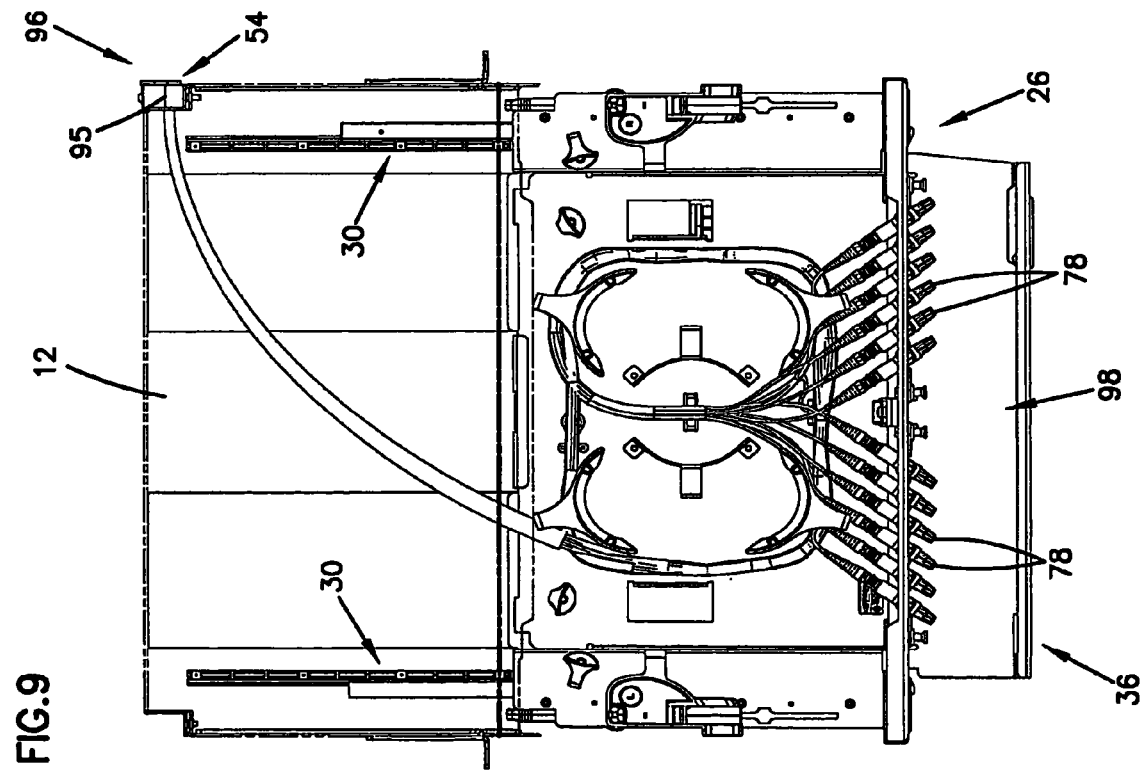

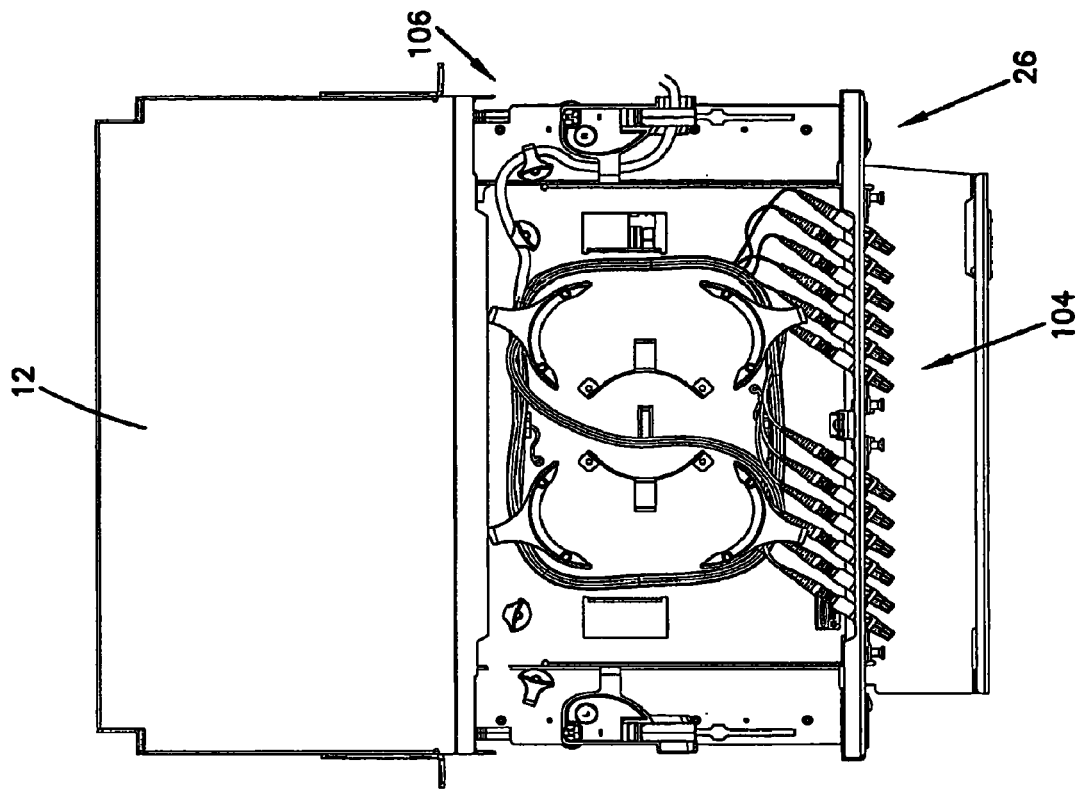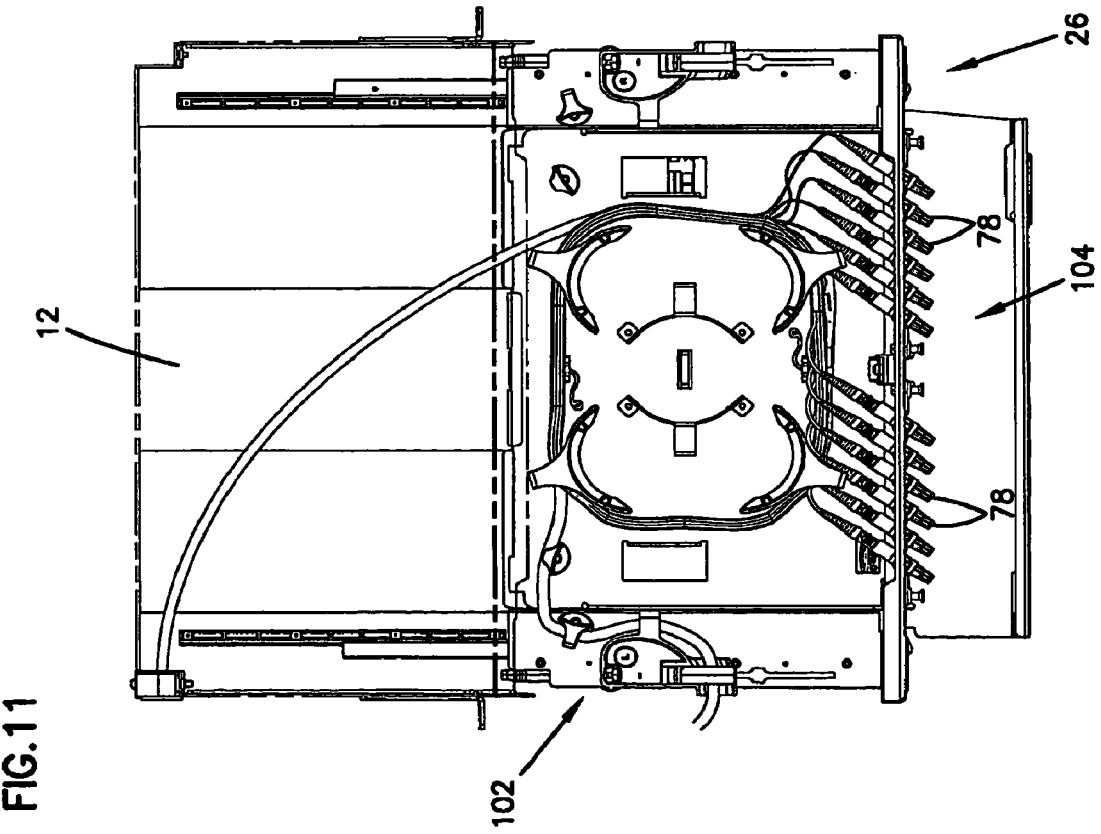

UNIVERSAL CABLE MANAGEMENT PANEL

CROSS-REFERENCE TO RELATED APPLICATIONS

This application is a continuation of U.S. application Ser. No. 12/381,160, filed Mar. 6, 2009 now U.S. Pat. No. 7,764,859; which application claims the benefit of U.S. Provisional Application Ser. No. 61/072,184, filed Mar. 28, 2008, and claims the benefit of U.S. Provisional Application Ser. No. 61/126,672, filed May 5, 2008; which applications are incorporated herein by reference.

TECHNICAL FIELD

This disclosure relates generally to devices for management of telecommunication cables and associated methods. More particularly, this disclosure relates to a cable management panel used in the telecommunications industry for managing fiber optic cables, and associated methods.

BACKGROUND

Cable management arrangements for cable termination, splice, and storage come in many forms. One cable management arrangement used in the telecommunications industry today includes sliding drawers installed on telecommunication equipment racks. The drawers provide organized, high-density, cable termination, splice, and storage in telecommunication infrastructures that often have limited space.

Because telecommunication infrastructures are massive in scale, original installation and subsequent adaptation of the infrastructures can be difficult to manage. Accordingly, the ability to adapt cable management arrangements and schemes is important. There is a continued need in the art for better cable management devices and arrangements to address concerns regarding adaptability and ease of use of cable management arrangements.

SUMMARY

The present disclosure relates to a cable management panel having a chassis and a sliding drawer. One aspect of the invention relates to the numerous cable routing arrangements that the present cable management panel can provide. Another aspect relates to a combination of structural features that the panel can accommodate, including face panel alternatives, drop-in tray alternatives, rear drawer wall alternatives, and cable routing alternatives.

A variety of examples of desirable product features or methods are set forth in part in the description that follows, and in part will be apparent from the description, or may be learned by practicing various aspects of the disclosure. The aspects of the disclosure may relate to individual features as well as combinations of features, including combinations of features disclosed in separate embodiments. It is to be understood that both the foregoing general description and the following detailed description are explanatory only, and are not restrictive of the claimed invention.

BRIEF DESCRIPTION OF THE DRAWINGS

FIG. 9 is a top plan view of the cable management panel of FIG. 1 including a cable routing having a rear cable entry and a split-front cable exit;

FIG. 10 is a top plan view of the cable management panel generally shown in FIG. 1 including a cable routing having the rear cable entry and the all rightward facing cable exit;

FIG. 11 is a top plan view of the cable management panel generally shown in FIG. 1 including a cable routing having a left side cable entry and an all leftward facing cable exit;

FIG. 12 is a top plan view of the cable management panel generally shown in FIG. 1 including a cable routing having a right side cable entry and the all leftward facing cable exit;

DETAILED DESCRIPTION

Figure 1:
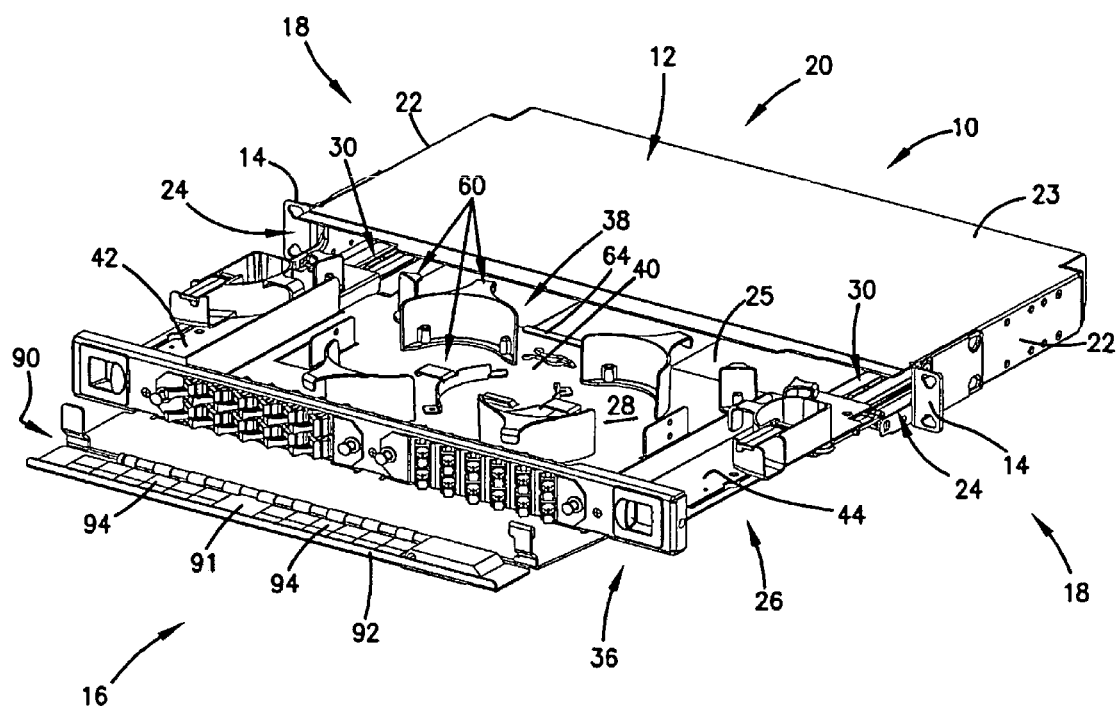
FIG. 1 is a front perspective view of one embodiment of a cable management panel according to the principles of the present disclosure, shown with a drawer of the panel in an open position.

Reference will now be made in detail to various features of the present disclosure that are illustrated in the accompanying drawings. Wherever possible, the same reference numbers will be used throughout the drawings to refer to the same or like parts.

Referring to FIGS. 1-4, a cable management panel or module 10 according to the present invention is shown. The panel 10 includes a frame or chassis 12 having mounting brackets 14. Further details of an example mounting bracket arrangement that can be used in accordance with the principles disclosed are described in U.S. Pat. No. 7,171,099; the disclosure of which is hereby incorporated by reference. The mounting brackets 14 are used to mount the panel 10 to a telecommunications structure, such as a telecommunications rack, for example. The cable management panel 10 can also be configured for mounting within a cabinet, enclosure, or on other mounting fixtures or framework. While the presently disclosed panel embodiments are illustrated in a horizontal mounting orientation, the panels can also be mounted in a vertical orientation.

The chassis 12 of the cable management panel 10 generally has a front 16, opposite sides 18, and a rear 20. The sides 18 are defined by sidewalls 22 each having side cable access openings 24 for cables entering or exiting the chassis 12. The chassis 12 further includes a top wall 23 and a bottom wall 25 opposite the top wall.

Referring still to FIGS. 1-4, the chassis 12 also includes a drawer 26 that slides between an opened position and a closed position. The drawer 26 slides relative to the chassis 12 between the opened and closed positions by way of two drawer slide assemblies 30 (FIG. 1). Each drawer slide assembly 30 is located at one of the sides 18 of the chassis 12. Further details of slide assemblies that can be used in the present cable management panel are described in U.S. Pat. No. 7,171,099; which disclosure is incorporated herein by reference. In the closed position, cables and components contained within an interior region 28 of the drawer 26 are enclosed and protected. In the opened position, the cables and components can be accessed for maintenance or repair purposes, for example.

Figure 2:
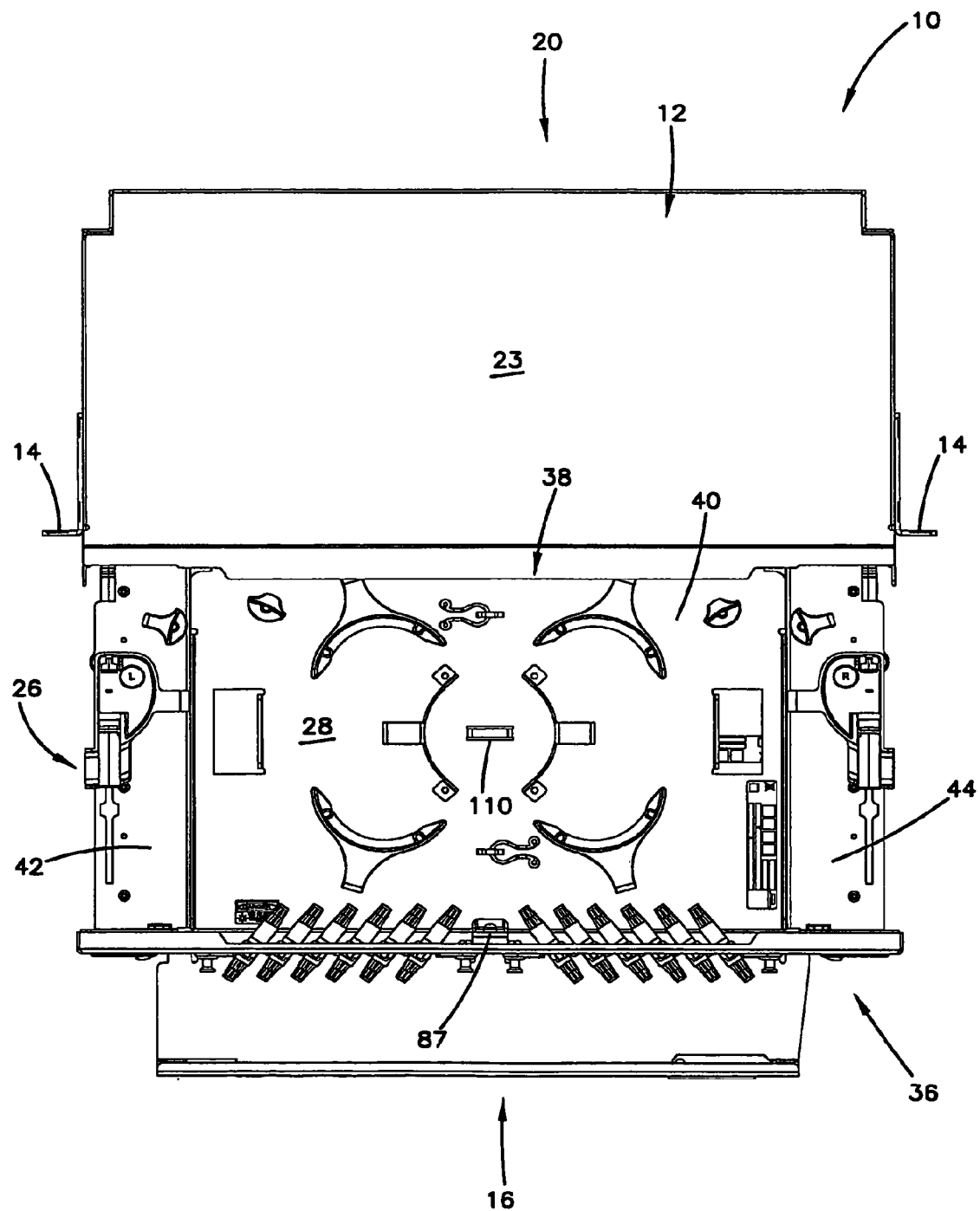
FIG. 2 is a top plan view of the cable management panel of FIG. 1.
Figure 3:
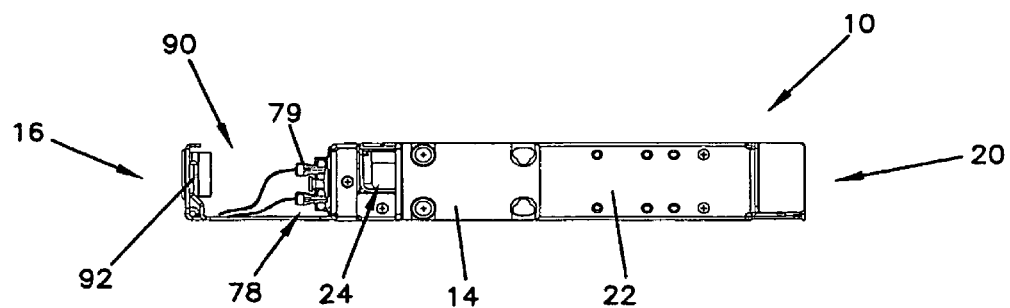
FIG. 3 is a side view of the cable management panel of FIG. 1, shown with the drawer of the panel in a closed position.
Figure 4:
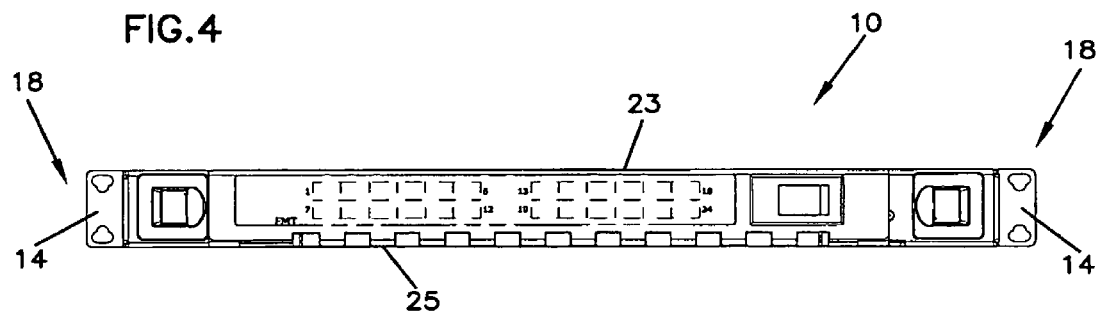
FIG. 4 is a front elevation view of the cable management panel of FIG. 3.
Figure 6:
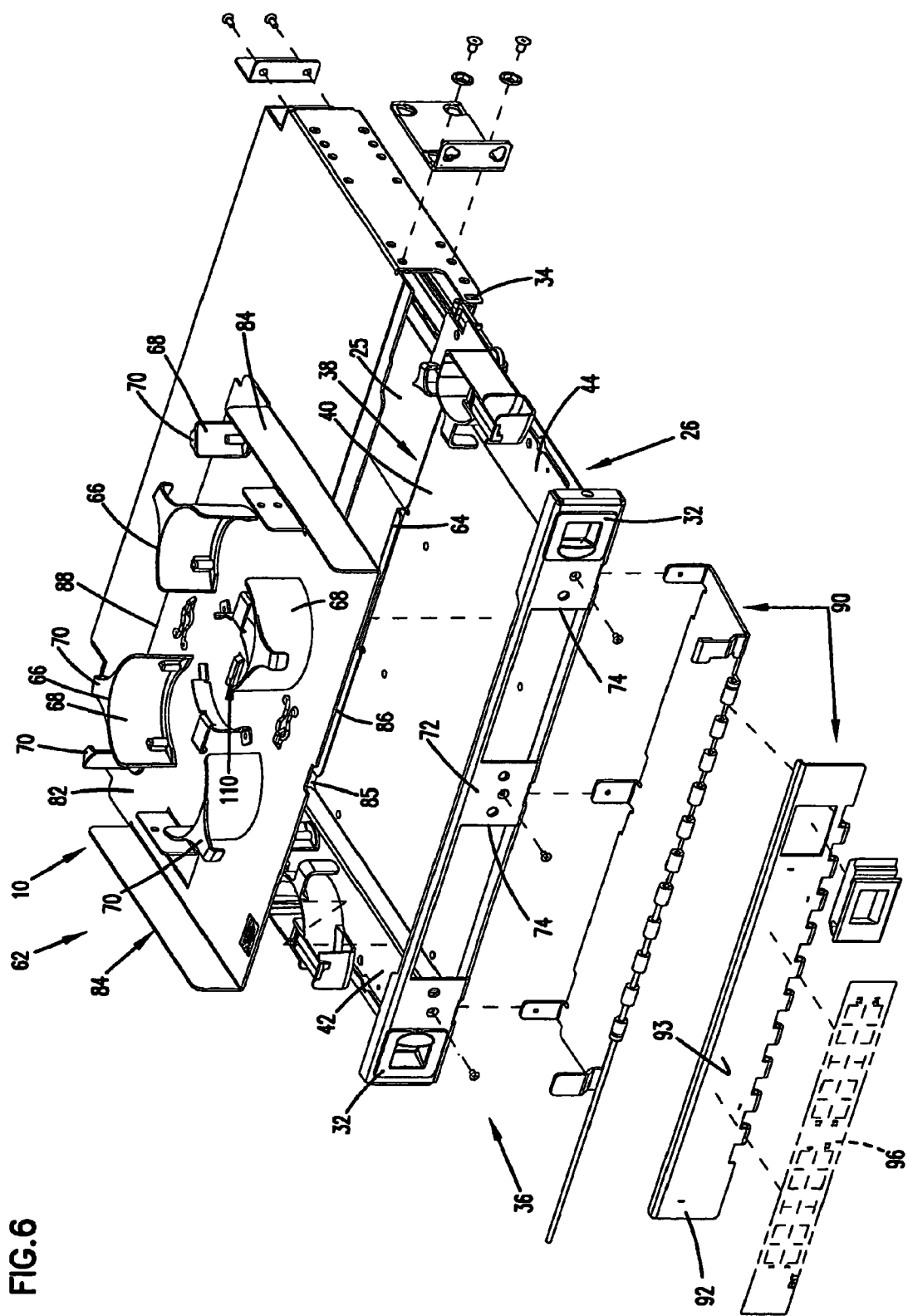
FIG. 6 is a further exploded, front perspective view of the cable management panel of FIG. 1.

Referring to FIGS. 1 and 2, the drawer 26 of the cable management panel 10 includes a front 36, a rear 38, a bottom or base 40, and sides 42, 44. The rear 38 of the drawer 26 is open (see also FIG. 6). Likewise, the sides 42, 44 of the drawer 26 are open (FIG. 6). What is meant by open is that the rear 38 and sides 42, 44 of the drawer 26 accommodate cable entry and exit as opposed to having an upright wall or side wall with an edge over which hanging cables would be damaged.

Figure 5:
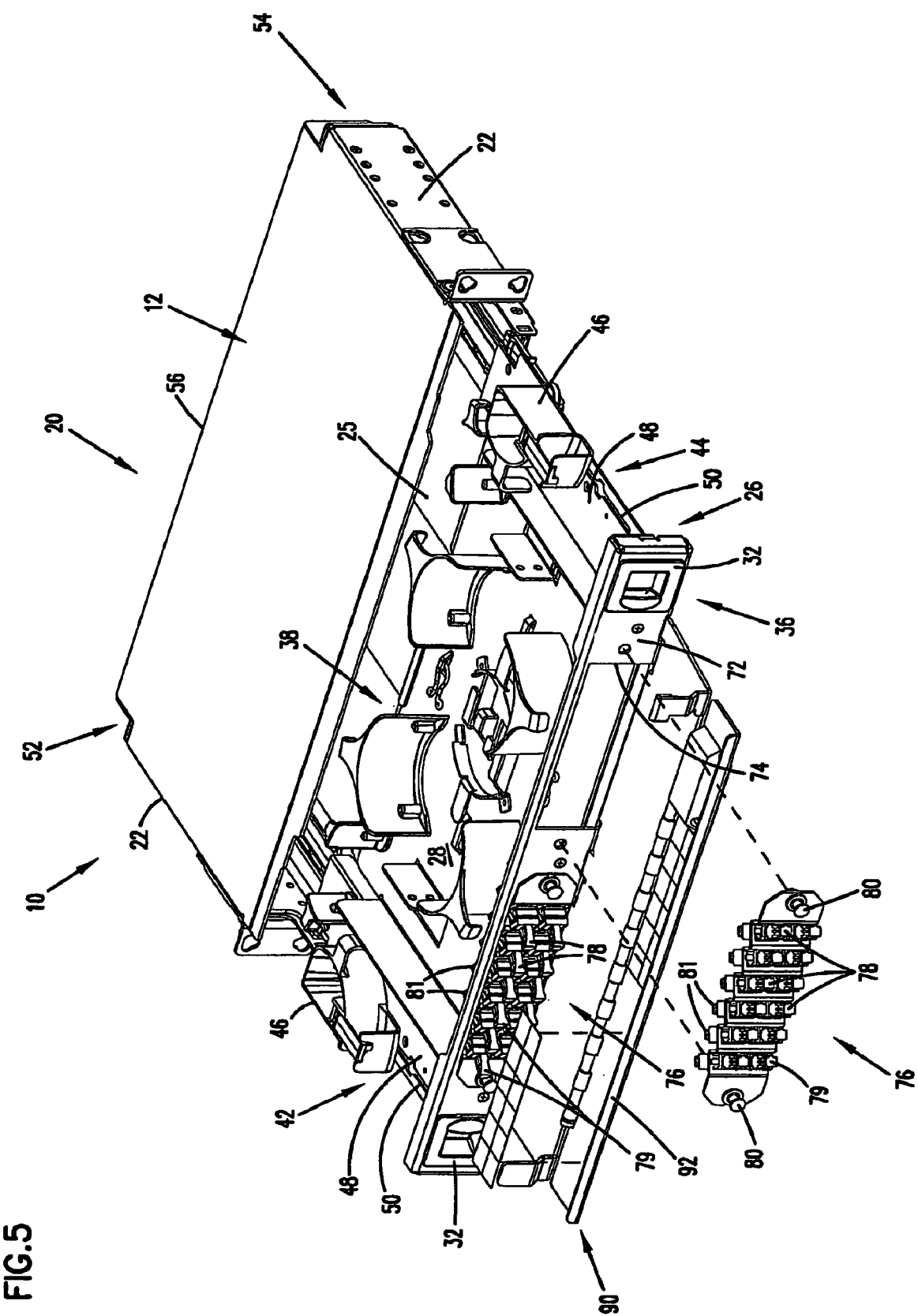
FIG. 5 is a partially exploded, front perspective view of the cable management panel of FIG. 1.

Referring now to FIG. 5, sliding radius limiters 46 are provided on the drawer 26 for managing the exiting and entering of cables during sliding movement of the drawer. The sliding radius limiters 46 also protect the cables from damage by limiting cable bending beyond a minimum bend radius. The sliding radius limiters 46 are mounted at the open sides 42, 44 of the drawer 26, and in particular, on horizontal side plates 48 that define the open sides of the drawer.

The side plates 48 of the base 40 define longitudinal slots 50. The longitudinal slots 50 cooperate with the radius limiters 46 on each side of drawer 26 to permit the radius limiters 46 to move relative to the drawer 26. In some embodiments, movement of the radius limiters 46 is controlled in a synchronized manner relative to the movement of the drawer 26. Further details of example drawers having radius limiters that can be used in the present cable management panel are described in U.S. Pat. Nos. 6,438,310; 6,504,988; and 7,079,744; the disclosures of which are hereby incorporated by reference.

Referring now to FIGS. 5 and 6, the front 36 of the drawer 26 is defined by a face panel 72. Latches 32 are provided at both sides of the drawer 26 in the face panel 72 for securing the drawer 26 in the closed position. In the closed position, each latch 32 engages a side hole 34 located at the side 18 of the chassis 12.

The face panel 72 also defines openings 74 sized for receipt of bulkhead adapter plates 76. The bulkhead adapter plates 76 include a plurality of angled adapters 78. The adapters 78 have a first connection end 79 accessible from an exterior of the drawer and chassis, and a second connection end 81 located within the interior region 28 of the drawer. In the illustrated embodiment, the bulkhead adapter plates 76 are manufactured by performing a minimum number of bending operations. The series of bending operations provides plates that have an improved, predetermined flatness characteristic. Further details of example bulkhead adapter plates formed by a minimum number of bending operations that can be used are described in U.S. Provisional Application No. 61/072,186, filed Mar. 28, 2008, and U.S. Application Ser. No. 12/381,162, filed Mar. 6, 2009; which applications are incorporated herein by reference.

Referring to FIG. 5, the bulkhead adapter plates 76 are secured within the openings 74 of the face panel 72 by fasteners 80, such as swell-type fasteners, for example. The bulkhead adapter plates 76 are designed to be removable and to fit and mount within each opening 74 of the face panel 72 in either a leftward facing direction or a rightward facing direction. That is, each bulkhead adapter plate 76 can mount within the opening 74 such that the adapters 78 angle toward the left, and can also mount within the opening 74 such that the adapters 78 angle toward the right. The adapters 78 can include SC and LC type adapters; other types of adapters can also be provided.

The present cable management panel also includes a front cable channel 90 having a flip-down panel or plate 92. The cable channel 90 is attached to the front 36 of the drawer 26 and moves with the drawer during drawer movement. Cables secured to or terminated at the first connection ends 79 of the adapters 78 in the face panel 72 are carried and protected within the channel 90 (see also FIG. 3). The flip-down plate 92 rotates or pivots to provide access to the adapters 78. The plate 92 also provides areas 91 (FIG. 1), 93 (FIG. 6) on which identification labels or other indicia 94 can be placed.

Referring again to FIG. 5, the cable management panel 10 of the present disclosure includes first and second rear access openings 52, 54. The first and second rear access openings 52, 54 are formed in the rear corners of the chassis; i.e., in a rear wall 56 and each sidewall 22 at the rear 20 of the chassis 12. In use, first and second cable pathways into or out from the interior region 28 of the drawer 26 are provided through the respective first and second rear access openings 52, 54, and through the open rear 38 of the drawer 26. Cables passing through the first or second rear access openings 52, 54 can be secured to the chassis 12 by a clamp arrangement 95 (FIG. 9).

In use, the bottom wall 25 of the chassis 12 aids in preventing cables that enter the rear access openings 52, 54 from becoming pinched during drawer movement. For example, when the drawer 26 slides from the closed position to the open position, cables extending through the rear openings to the drawer can be pulled forward; or at the least are no longer contained within the interior region 28 of the drawer (i.e., the drawer 26 slides out while the cables extending through the open rear 38 remain stationary). When the drawer is closed, the bottom wall 25 of the chassis 12 prevents cable slack from falling through the chassis and otherwise becoming pinched between the drawer and the rear wall 56 of the chassis. Instead, the cable slack is maintained on generally the same level as the rearward moving drawer and is thereby better accommodated.

Referring back to FIG. 1, the drawer 26 of the illustrated embodiment includes a variety of cable management elements 60 (e.g., cable management structures and distribution components or devices). The interior region 28 of the drawer 26 is sized for receiving the cable management elements 60. When the drawer 26 is in the closed position, the cables and cable management elements 60 in the interior region 28 are protected. In some embodiments, a number of the elements 60 are provided on a drop-in tray or tray insert 62 (FIG. 6), which drops into the interior region 28 of drawer 26. The cable management elements 60 can be mounted to the tray 62 by fasteners, bonded by adhesive, or formed as an integral construction of the tray. In FIG. 6, the drop-in tray 62 is shown prior to insertion into the interior region 28 of the drawer 26.

Referring to FIG. 6, the illustrated drop-in tray 62 has a planar bottom 82 and upstanding sides 84. The upstanding sides 84 extend perpendicular to the planar bottom 82 and are positioned adjacent to the open sides 42, 44 of the drawer 26 when the tray 62 is positioned within the interior region 28 of the drawer. The upstanding sides 84 of the drop-in tray 62 provide separation between cables routed on the drop-in tray 62 and cables entering or exiting the drawer at the open sides 42, 44. Alternatively, trays have no upstanding sides may also be used.

The drop-in tray 62 of the present cable management panel 10 is designed to fit within the interior region 28 of the drawer 26 in a particular orientation. A notch 85 formed along a front edge 86 of the planar bottom 82 dictates the particular orientation. In particular, the notch 85 provides clearance for securing elements, such as a snap clip 87 (FIG. 2), located within the drawer. In the panel embodiment, the snap clip 87 not only secures the tray to the drawer, but also functions as a keying element that determines the particular orientation in which the tray is properly inserted. In an alternative embodiment, the drop-in tray can be reversible; i.e., can be selectively positioned in a first orientation or a second orientation that is 180 degrees relative to the first orientation. Details of reversible drop-in trays that can be used in the present drawer arrangement are described in U.S. Publication No. 2007/0031099; which disclosure is incorporated herein by reference.

Referring back to FIGS. 1 and 6, to further aid in securing the drop-in tray 62 within the drawer 26, a roll or lip 64 is provided adjacent to the open rear 38 of the drawer 26. When the drop-in tray 62 is inserted within the interior region 28 of the drawer 26, a rear edge 88 of the planar bottom 82 of the tray is positioned within a space or gap provided under the lip 64. In one embodiment, the lip 64 is manufactured by rolling or curling an extension of the base 40 of the drawer 26 upward. The rolled extension or lip 64, in cooperation with the clip 87 and notch 85 function to retain the drop-in tray 62 in the particular orientation.

Referring still to FIGS. 1 and 6, and as previously described, the drop-in tray 62 can include a number of cable management elements 60 for use with fiber optic cables. Examples of cable management elements include constructions, assemblies, and devices for storing cables or connecting cables to other cables; and/or other fiber optic devices, such as attenuators, couplers, switches, wave divisions multiplexers (WDMs), and splitters/combiners. U.S. Pat. Nos. 6,438,310 and 6,504,988, previously incorporated herein by reference, describe other customized element arrangement examples that can be used in accordance with the principles disclosed.

Figure 7:
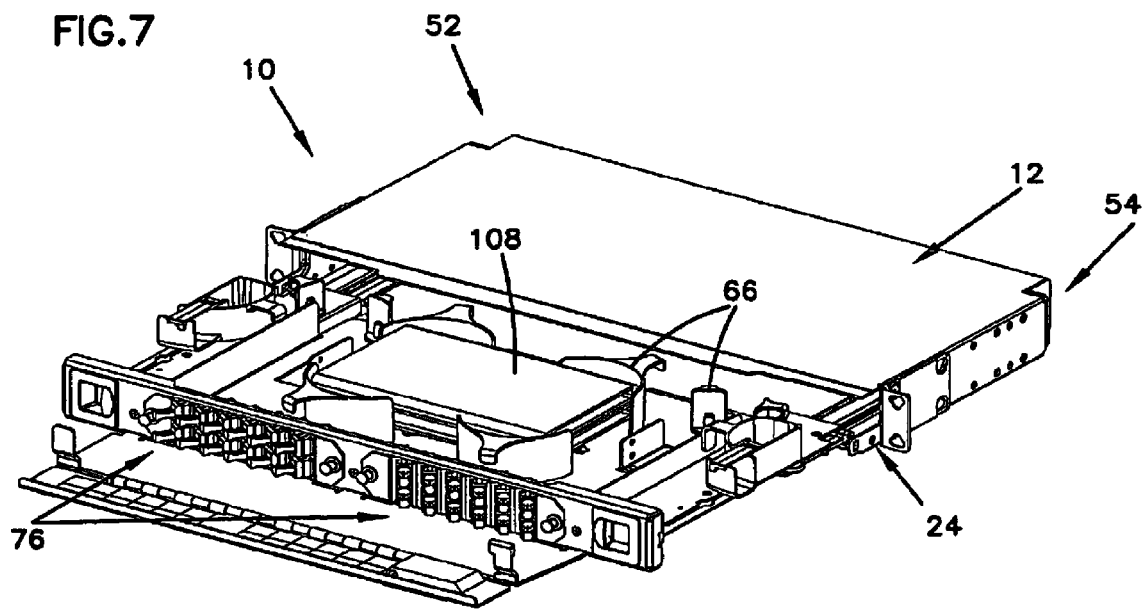
FIG. 7 is a front perspective view of the cable management panel of FIG. 1, including a splice tray.
Figure 8:
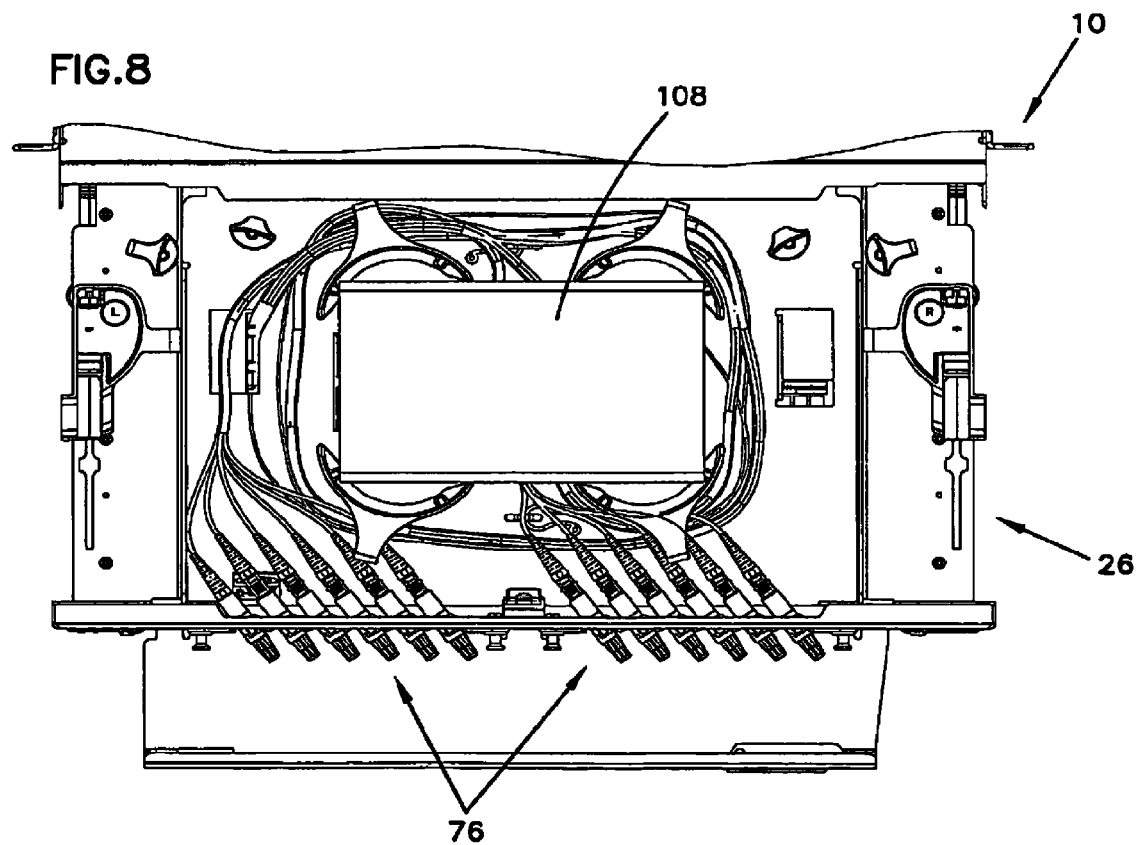
FIG. 8 is a partial top plan view of the cable management panel generally shown in FIG. 7 including a cable routing having an all rightward facing cable exit.
Figure 13:
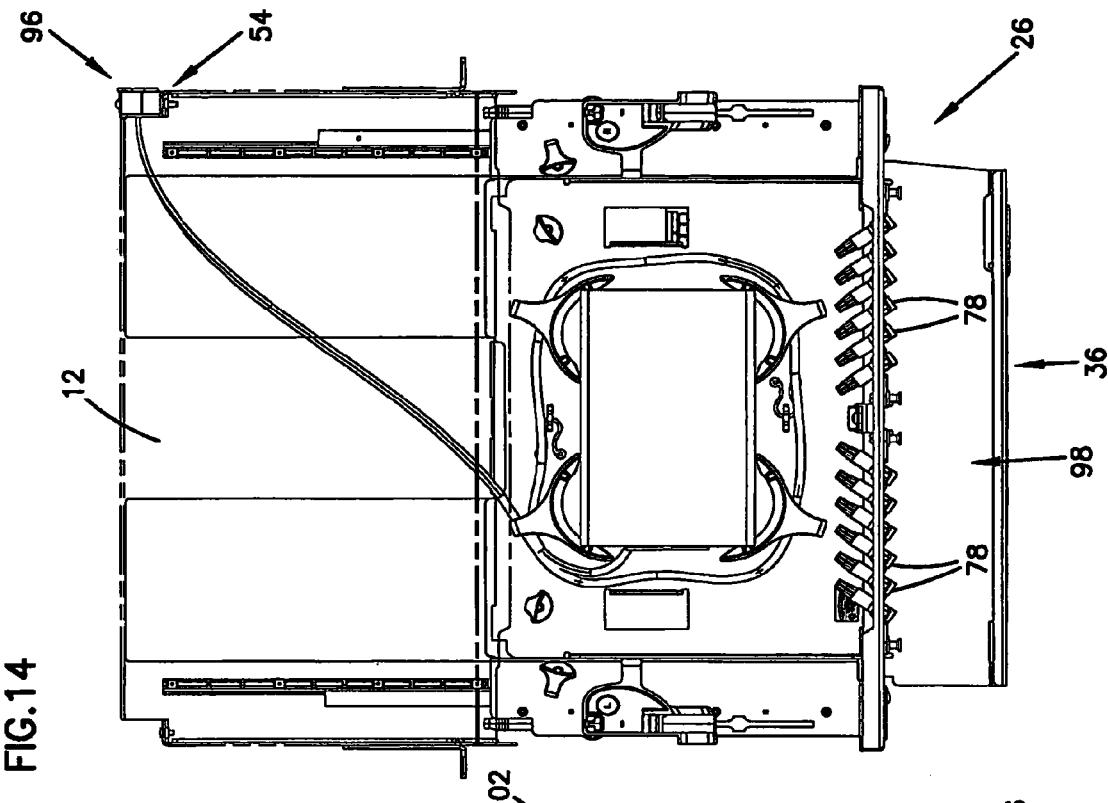
FIG. 13 is a top plan view of the cable management panel of FIG. 7 including a cable routing having the right side cable entry and the split-front cable exit.

In the illustrated embodiment, the tray 62 includes cable guides 66 positioned at various locations on the planar bottom 82. The cable guides 66 extend upwardly from the bottom 82, and each include a main arcuate section 68 and an outwardly extending retention tab 70. The cable guides 66 aid in organizing the cables within the drawer 26 and prevent cable damage due to excessive bending. Referring now to FIGS. 7 and 8, the various cable management structures and distribution components or devices can also include, for example, a splice tray 108. In the illustrated embodiment, the drop-in tray 62 includes securing structure 110 (see FIGS. 2 and 6) centrally located on the tray. The splice tray 108 mounts to the securing structure 110 for use in applications requiring fiber splicing.

Referring generally now to FIGS. 1-8, the rear openings 52, 54 and the side access openings 24 of the present chassis each provide cable access to and from the interior region 28 of the drawer. Providing these entry and exit options allow a user to customize the present cable management panel to meet a specific requirement. Similarly, the selective mounting orientation of the presently disclosed bulkhead adapter plates 76 also allows a user to further customize the cable management panel to meet a specific requirement.

Accordingly, the cable management panel 10 accommodates a number of cable routing configurations. The cable routing configurations each include a cable entry in combination with a cable exit. Each of the rear openings 52, 54 and side access openings 24 of the chassis 12, for example, define a cable entry. Cable "entry" is meant to be a location through which cable passes into or out from the interior of the chassis or drawer (the term cable "entry" being used for clarity purposes only).

The exterior connection ends 81 of the bulkhead adapter plates 76 define the cable "exit." Cable "exit" is meant to be the location at which cables other than the entering cables extend from the chassis and/or drawer. As previously discussed, cables interconnect to the connection ends 81 of the adapter 78; each bulkhead adapter plate 76 can be mounted to the front 36 of the drawer in either a leftward facing direction or a rightward facing direction. Accordingly, the cable exit of a particular panel can be either all leftward facing, all rightward facing, or be a split-front cable exit. A split-front cable exit typically includes first and second bulkhead adapter plates 76 having adapters angled away from one another (toward the closest side of the chassis) so that the exiting cables do not cross over one another.

Figure 14:
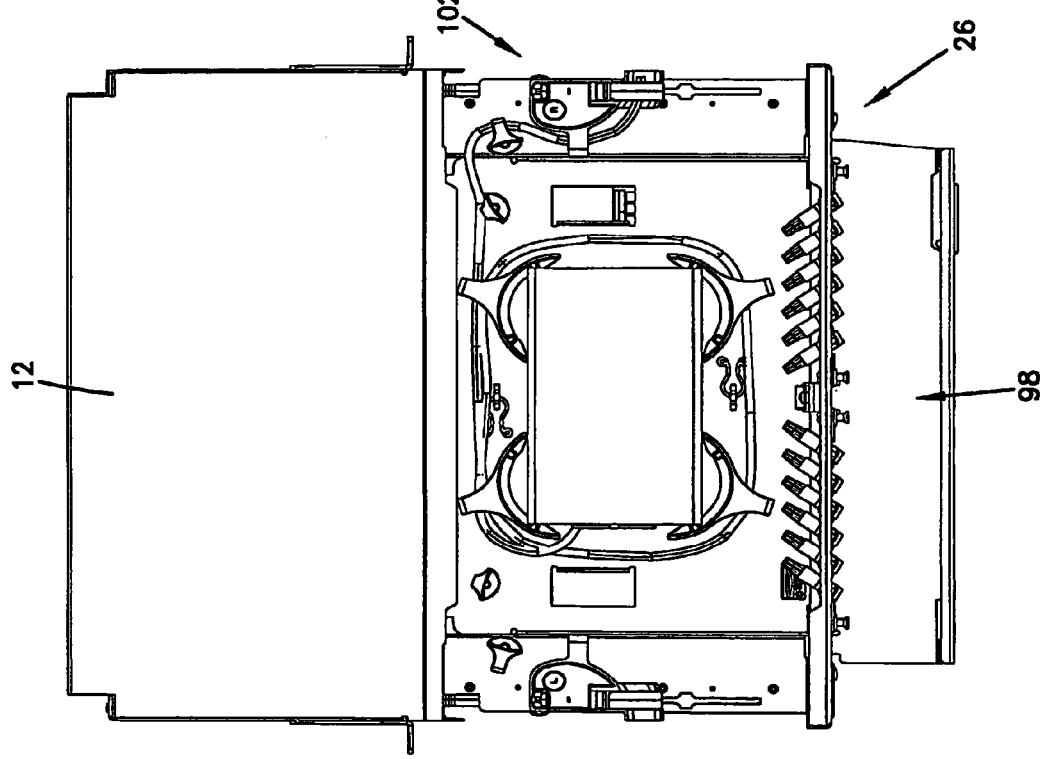
FIG. 14 is a top plan view of the cable management panel of FIG. 7 including a cable routing having the rear cable entry and the split-front cable exit.

Any one of the above cable entries can be combined with any one of the above cable exits. Referring to FIGS. 9-14, the cable entry and the cable exit of differently configured panels are illustrated. In FIGS. 9 and 14, the panels have a right rear cable entry 96 and a split-front cable exit 98. That is, cables enter the chassis 12 at the right rear access opening 54, and cables "exit" or are attached to adapters 78 on the face panel 72 that are split into leftward angled adapters and rightward angled adapters. In FIG. 10, the panel has the right rear cable entry 96 and an all rightward facing cable exit 100. That is, cables enter the chassis at the right rear access opening 54, and cables "exit" or are attached to adapters 78 that all face in a rightward direction. In FIG. 11, the panel has a left side cable entry 102 and an all leftward facing cable exit 104. That is, cables enter the chassis/drawer at the left side of the chassis/drawer, and cables "exit" or are attached to adapters 78 that all face in a leftward direction. In FIG. 11, the panel has a right side cable entry 106 and the all leftward facing cable exit 104.

As can be understood, the various cable entries and cable exits can be combined in a number of ways to meet a user's particular requirements. This includes combining the split-front cable exit 98 with any of a left rear cable entry (i.e., cables enter the chassis 12 at the left rear access opening 52), the left side cable entry 102 (see FIG. 13), or the right side cable entry 106. Likewise, the all leftward facing cable exit 104 can be combined with either one of a left rear cable entry or the right rear cable entry 96. Also, the all rightward facing cable exit 100 can be combined with any of a left rear cable entry, the left side cable entry 102, or the right side cable entry 106.

The present cable management panel 10 accommodates a number of cable routing alternatives. In addition to the cable routing alternatives, the present panel also accommodates the combination of alternative structural features, including face panel alternatives, drop-in tray alternatives, rear drawer wall alternatives, as well as other structural options and alternatives.

Figure 15:
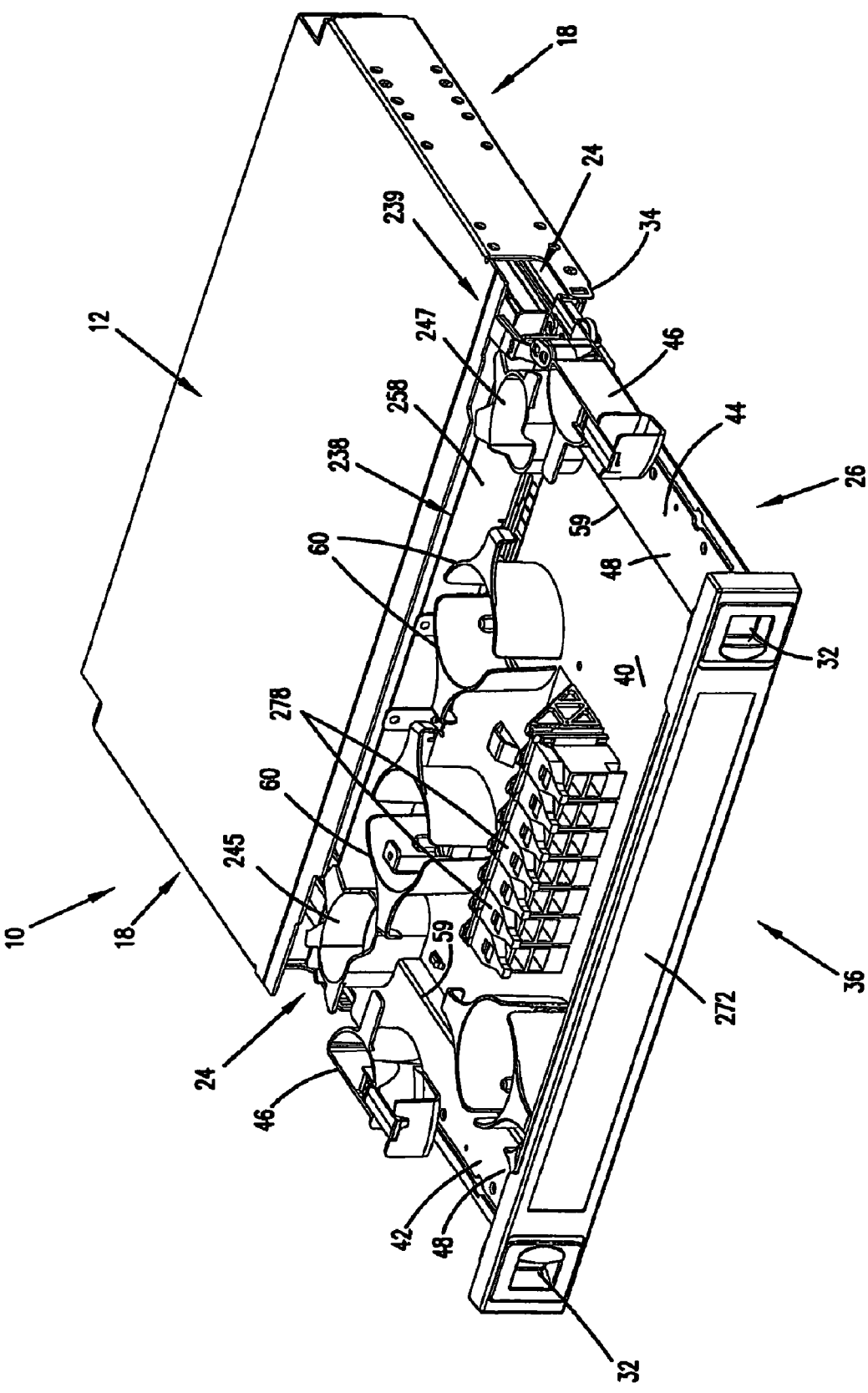
FIG. 15 is front perspective view of another panel configuration of the cable management panel of FIG. 1, according to the principles of the present disclosure.
Figure 16:
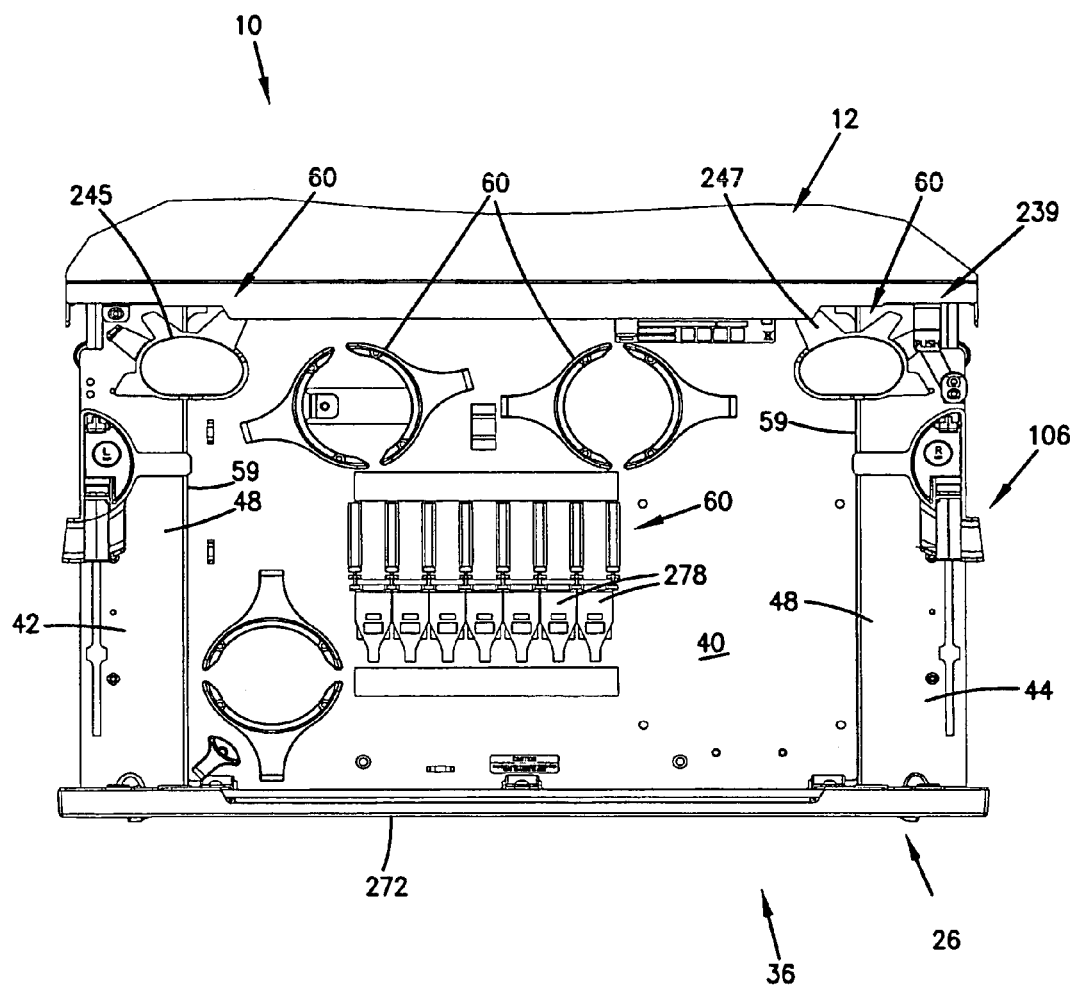
FIG. 16 is a partial top plan view of the cable management panel of FIG. 15.

For example, referring now to FIGS. 15 and 16, the cable management panel 10 of FIGS. 1-4 is illustrated with a second panel configuration. The cable management panel 10 shown in FIG. 15 includes several similar components as the previous panel configuration, such as the chassis 12 and the sliding drawer 26. In contrast to the previous embodiment, however, the drawer 26 alternatively has a rear 238 that is closed. More specifically, an optional wall 258 has been mounted at the open rear 38 of the drawer 26. The sides 42, 44 of the drawer 26 are still open. In this particular configuration, which includes the rear wall 258, cable entry will typically be located only at either one of the left and right sides 42, 44 of the drawer/chassis. The sliding radius limiters 46 located at the sides 42, 44 of the drawer manage the exiting and entering cables during sliding movement of the drawer 26.

Still referring to FIGS. 15 and 16, the front 36 of the drawer is defined by an alternative face panel 272. Similar to the previous panel configuration, latches 32 are provided at both sides of the drawer 26 in the face panel 272 for securing the drawer 26 in the closed position. In the closed position, each latch 32 engages a side hole 34 located at the side 18 of the chassis 12. In this embodiment, the face panel 272 does not however have openings (e.g. 74, FIG. 5) for receipt of bulkhead adapter plates. Accordingly, the optional front cable channel (e.g., 90, FIG. 1) that carries and protects cables attached to the bulkhead adapter plates is also not present. Instead, the present panel includes sliding adapters 278 that are mounted to the base 40 of the drawer. The sliding adapters 278 can include SC and LC type adapters; other types of adapters can also be provided. The sliding adapters 278 can include lever arms that allow one of a plurality of the sliding adapters 278 to be lifted upwardly for access. Further details of an example sliding adapter arrangement that can be used in accordance with the principles disclosed are described in U.S. Pat. No. 5,497,444; the disclosure of which is hereby incorporated by reference.

The present panel does not include a drop-in tray; rather all the cable management elements 60 are mounted directly to the drawer. In other embodiments, the sliding adapters 278 are mounted to a drop-in tray to allow a technician to later re-configure the drawer by merely removing and replacing of the tray.

Figure 17:
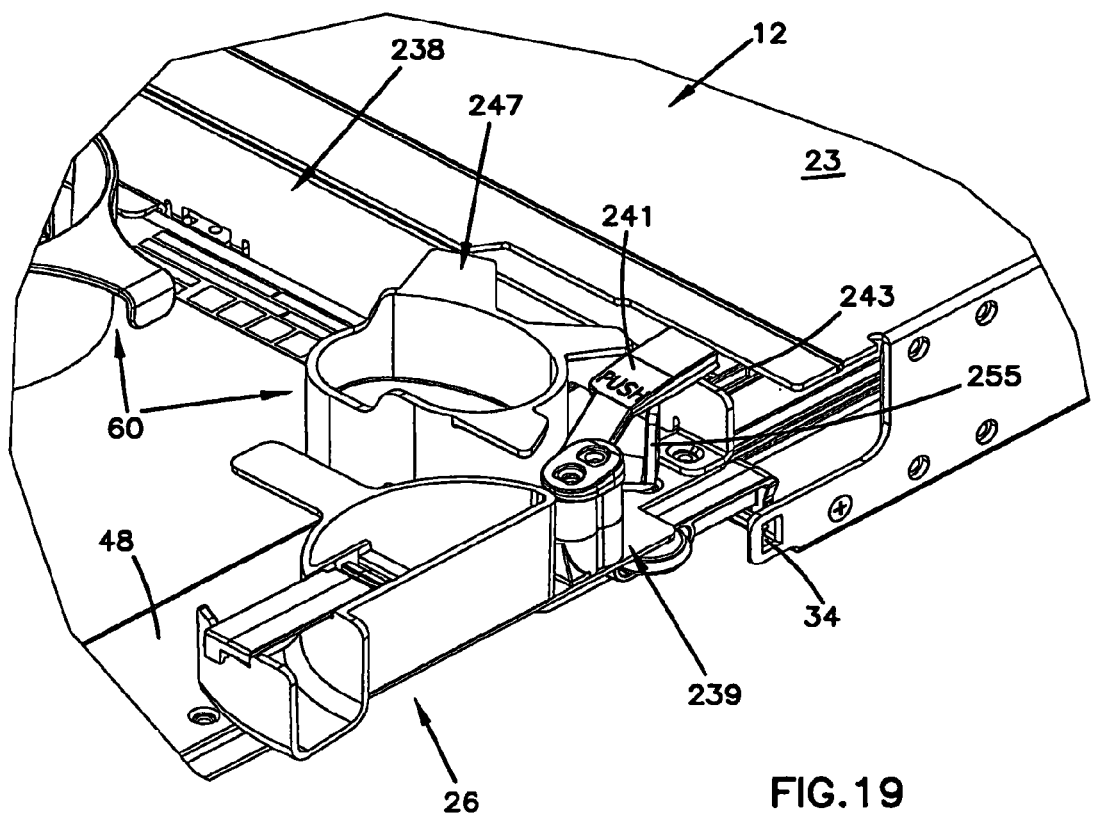
FIG. 17 is an enlarge perspective view of a portion of the cable management panel of FIG. 15.

The cable management panel of FIGS. 15 and 16 also includes a rear latch arrangement 239. The rear latch arrangement 239 prevents inadvertent closing movement of the drawer 26 relative to the chassis 12 when the drawer is positioned in the open position. The rear latch arrangement 239 mounts to the side plate 48 at either one of the sides 42, 44 of the drawer 26. Because the rear latch arrangement 239 mounts to the drawer side plates 48, the rear wall 258 of the drawer 26 is optional; i.e., the embodiment of FIG. 1 having a drawer with an open rear 38 can also utilize the present rear latch arrangement 239. Referring to FIG. 17, in use, a latch arm 241 of the rear latch arrangement 239 engages the front edge 243 of the top wall 23 of the chassis 12 to prevent inadvertent closing movement of the drawer 26 relative to the chassis 12. To close the drawer, the latch arm 241 is flexed downward beneath the top wall 23 to disengage the arm from the front edge 243 of the chassis top wall. Further details of an example rear latch arrangement that can be used in accordance with the principles disclosed are described in U.S. Provisional Application No. 61/072,148, filed Mar. 28, 2008, and U.S. application Ser. No. 12/381,159, filed Mar. 6, 2009; the disclosures of which are herein incorporated by reference.

Referring still to FIGS. 15 and 16, the side access openings 24 of the chassis 12 define both the cable entry and the cable exit in this second panel configuration. For example, cables can enter the chassis 12 at the right side cable entry 106 (FIG. 16) and terminate to the sliding adapters 278. Cables that are attached to adapters 278 typically exit the drawer 26 and/or chassis 12 at the other side of the drawer (e.g., at the left side cable "exit"). Cables may also be routed to both enter and exit at the same side of the drawer/chassis.

Referring now to FIGS. 16 to 19, the cable management elements 60 of this second panel configuration include first and second radius limiting structures 245, 247. Unlike the sliding radius limiters 46, the first and second radius limiting structures are stationary. The first radius limiting structure 245 is mounted at the left side 42 of the drawer 26 adjacent to the rear 238 of the drawer; the second radius limiting structure 247 is mounted at the right side 44 of the drawer 26 adjacent to the rear 238 of the drawer.

Each of the radius limiting structures 245, 247 includes an arcuate body 249 and a number of retaining fingers, including three upper fingers 251 and a lower finger 253 located at an opposite end of the arcuate body as that of the upper fingers 251. Cables are wrapped about the structure's arcuate body 249. The lower finger 253 has an upwardly extending tab 255 that prevents these wrapped cables from unintentionally exiting the drawer 26 at the rear or sides.

Figure 19:
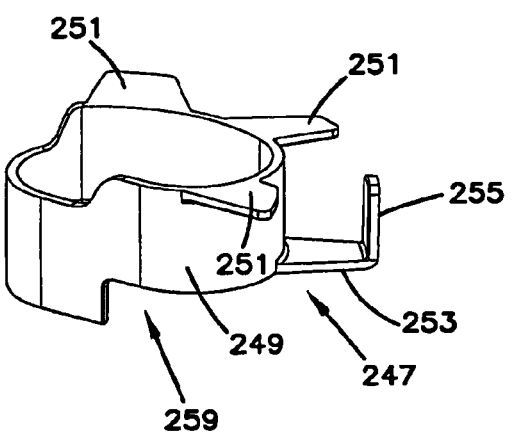
FIG. 19 is a second side perspective view of the radius limiting structure of FIG. 18.
Figure 18:
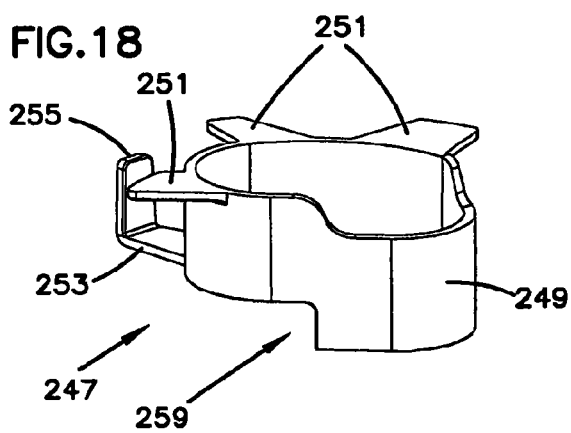
FIG. 18 is a first side perspective view of one embodiment of a radius limiting structure of the cable management panel of FIG. 15.
Figure 20:
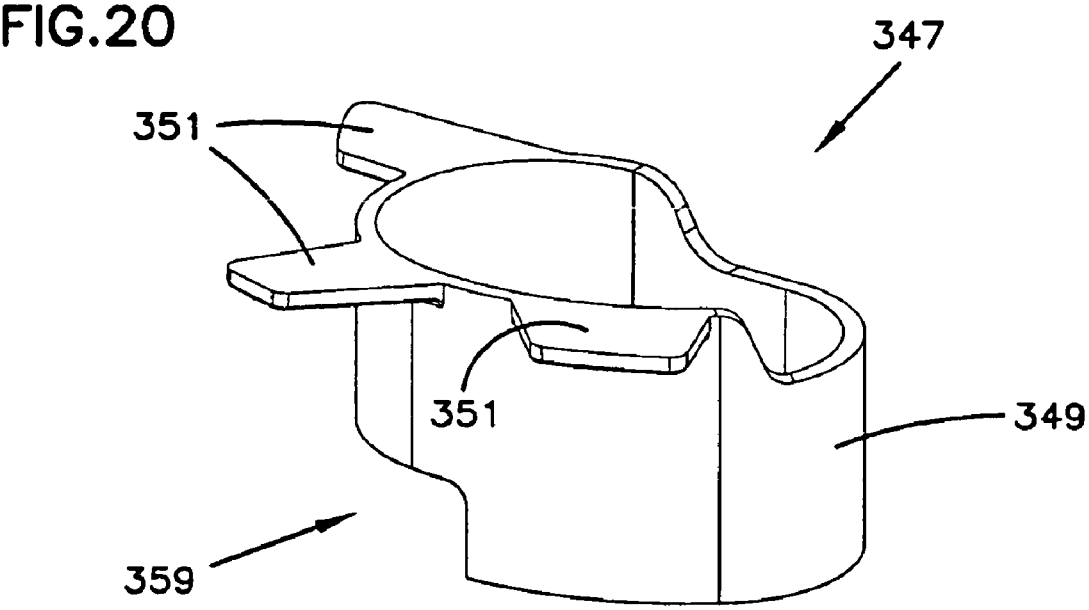
FIG. 20 is a first side perspective view of another embodiment of a radius limiting structure of the cable management panel that can be used in the cable management panels of the present disclosure.
Figure 21:
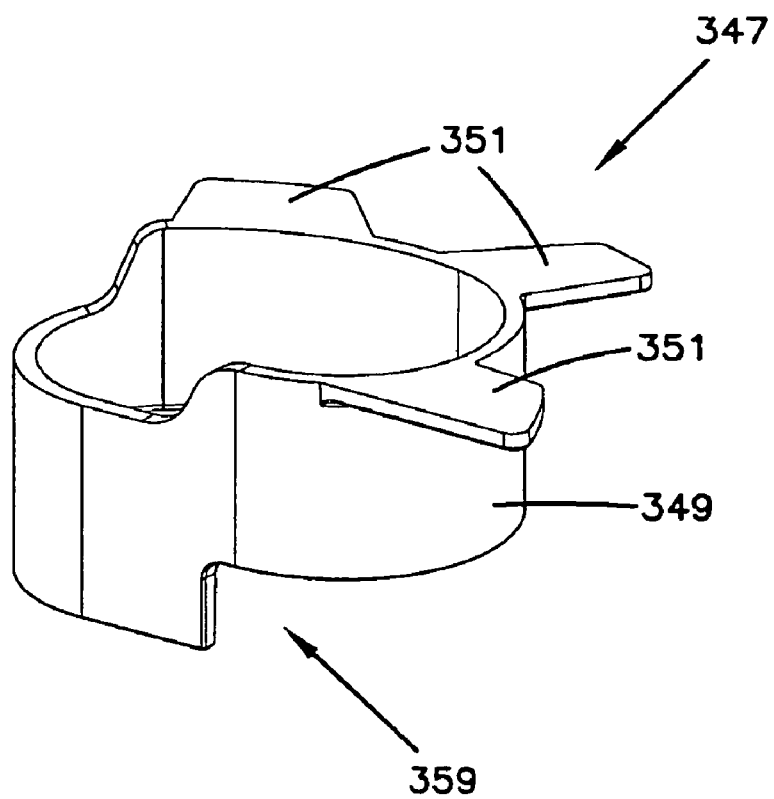
FIG. 21 is a second side perspective view of the radius limiting structure of FIG. 20.
Figure 22:
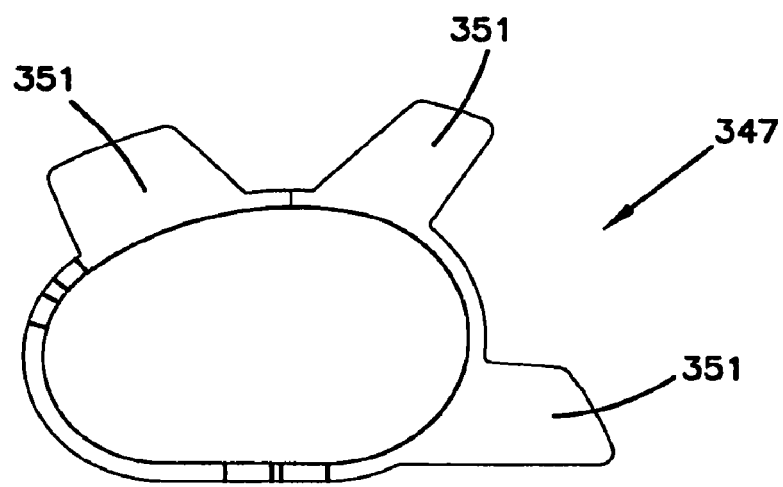
FIG. 22 is a top plan view of the radius limiting structure of FIG. 21.
Figure 23:
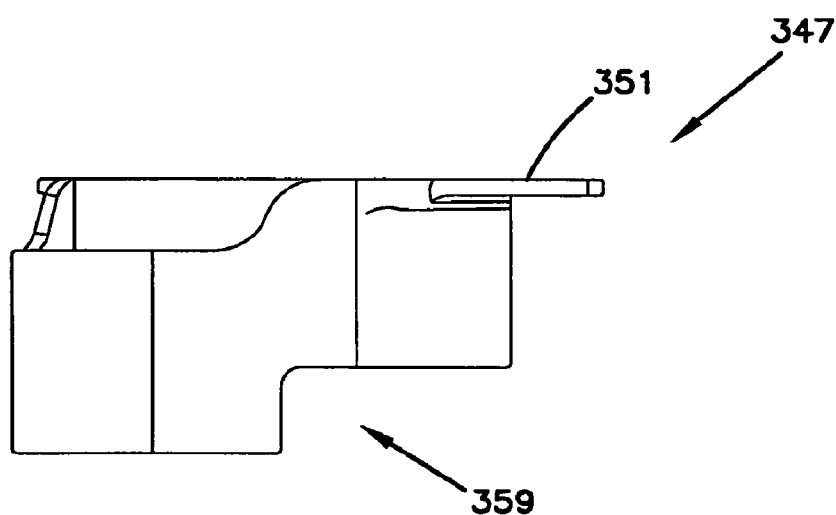
FIG. 23 is a side elevation view of the radius limiting structure of FIG. 22.
Figure 24:
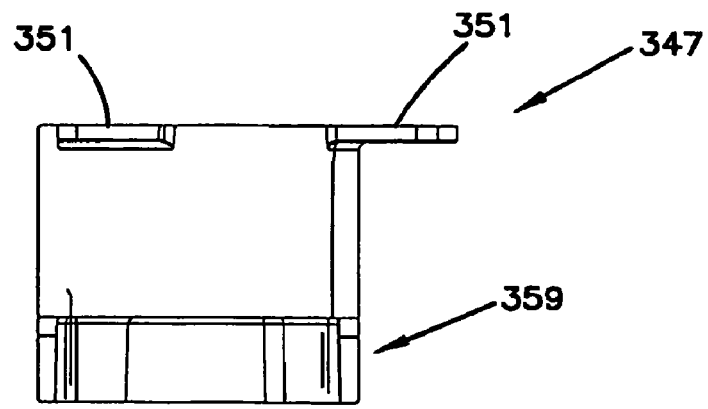
FIG. 24 is another side elevation view of the radius limiting structure of FIG. 23.

Referring to FIGS. 18 and 19, each of the radius limiting structures (e.g., 247) has a step feature 259 (e.g., a notch formed in the bottom of the arcuate body 249). When mounted to the drawer 26, the step feature 259 of the radius limiting structure 245, 247 receives a drawer shoulder 59 (FIGS. 15 and 16) that joins the base 40 and the sides 42, 44. The step feature 259 accommodates placement of the radius limiting structures 245, 247 in a stepped region of the drawer to maximize the useable space within the interior region 28 of the drawer 26.

Referring now to FIGS. 20-24 another radius limiting structure 347 is illustrated. Like the radius limiting structure of FIGS. 18 and 19, the radius limiting structure 347 is stationary and can be used in any of the drawer arrangements disclosed herein. The radius limiting structure 347 is typically mounted at one of the left and right sides of the drawer adjacent to the rear of the drawer.

This second radius limiting structure 347 embodiment is similar to the previous embodiment with the exception of the absence of a lower finger (e.g., 253, FIG. 18). For example, the radius limiting structure 347 includes an arcuate body 349 and a number of retaining fingers, including three spaced-apart upper fingers 351. The three fingers 351 are located at and project outward from a top edge of the arcuate body 349. Also similar to the previous embodiment, and referring to FIGS. 16 and 17, when positioned within the drawer, the three fingers 351 of the radius limiting structure 347 are oriented or project toward the rear corner of the drawer.

Further like the previous embodiment, the radius limiting structure 347 has a step feature 359 (e.g., a notch formed in the bottom of the arcuate body 349). When mounted to the drawer, the step feature 359 of the radius limiting structure 347 receives a drawer shoulder 59 (FIGS. 15 and 16) that joins the base 40 and the sides 42, 44. The step feature 359 accommodates placement of the radius limiting structure 347 in a stepped region of the drawer to maximize the useable space within the interior region of the drawer.

The above specification provides a complete description of the invention. Since many embodiments of the invention can be made without departing from the spirit and scope of the invention, certain aspects of the invention reside in the claims hereinafter appended.

What is claimed is:

1. A cable management panel, comprising:
   a) a chassis; and
   b) a drawer slidably mounted to the chassis, the drawer including a front face panel that defines openings and a plurality of angled adapters mounted within the openings, each angled adapter having a first end accessible from an exterior of the drawer and a second end located within an interior of the drawer, the drawer including bulkhead adapter plates that mount within the openings of the front face panel, the bulkhead adapter plates including the plurality of angled adapters;
   c) wherein the cable management panel accommodates a number of cable routing configurations including a cable entry in combination with any one of three cable exits;
      i) the cable entry including one of a rear cable entry located at a rear of the chassis and a side cable entry located at a side of the chassis; and
      ii) the three cable exits including an all leftward facing cable exit defined by leftward angled adapters, an all rightward facing cable exit defined by rightward angled adapters, and a split-front cable exit defined by leftward angled adapters and rightward angled adapters.

2. The panel of claim 1, wherein the bulkhead adapter plates are formed by a series of bending operations that provides a predetermined flatness characteristic.

3. The panel of claim 1, wherein the routing configuration of the cable management panel is defined by the rear cable entry in combination with any one of the three cable exits.

4. The panel of claim 1, wherein the routing configuration of the cable management panel is defined by the side cable entry in combination with any one of the three cable exits.

5. The panel of claim 1, wherein the cable management panel accommodates either one of both the rear cable entry and the side cable entry in combination with any one of the three cable exits.

6. A cable management panel, comprising:
   a) a chassis;
   b) a drawer slidably mounted to the chassis, the drawer being constructed to slide between an open position and a closed position relative to the chassis, the drawer including a base and a face panel, the base defining open sides;
   c) a removable drop-in plate positioned within the drawer, the drop-in plate having cable management elements mounted thereon, the drop-in plate including upstanding sides located adjacent to the open sides of the drawer;
   d) angled adapters mounted in the face panel of the drawer, the angled adapters having a first end accessible from an exterior of the drawer and a second end located within an interior of the drawer; and
   e) a front cable channel mounted to the drawer forward of the face panel, the front cable channel having a flip-down plate that provides access to the first ends of the angled adapters;
   wherein the angled adapters are carried by removable bulkhead adapter plates mounted within openings formed in the face panel of the drawer.

7. The panel of claim 6, further including a sliding radius limiter located at one of the open sides of the drawer.

8. The panel of claim 6, wherein the chassis defines rear openings and side openings, each of the rear and side openings providing cable access to and from an interior of the chassis.

9. The panel of claim 6, wherein the base of the drawer defines an open rear, the base including a rolled lip located at the open rear, a rearwardly oriented edge of the drop-in plate being received within the rolled lip of the base.

10. The panel of claim 6, wherein the removable bulkhead adapter plates are formed by a series of bending operations that provides a predetermined flatness characteristic.

11. A cable management panel, comprising:
    a) a chassis;
    b) a drawer slidably mounted to the chassis, the drawer being constructed to slide between an open position and a closed position relative to the chassis;
    c) a sliding radius limiter located adjacent to one side of the drawer; and
    d) a stationary radius limiting structure including:
       i) an arcuate body having a stepped construction that mounts to a shoulder formed in the drawer;
       ii) upper fingers located at a top edge of the arcuate body, the upper fingers projecting outward from the top edge of the arcuate body; and
       iii) a lower finger located at a bottom edge portion of the arcuate body.

12. The panel of claim 11, wherein the stationary radius limiting structure includes three upper fingers located at the top edge of the arcuate body, the three upper fingers projecting outward from the top edge of the arcuate body.

13. The panel of claim 11, wherein the lower finger of the stationary radius limiting structure includes a tab that extends upward from the lower finger.

14. The panel of claim 11, further including bulkhead adapter plates mounted in a face panel of the drawer, the bulkhead adapter plates including angled adapters having a first end accessible from an exterior of the drawer and a second end located within an interior of the drawer, the bulkhead adapter plates being formed by a series of bending operations that provides a predetermined flatness characteristic.

15. A cable management panel, comprising:
    a) a chassis;
    b) a drawer slidably mounted to the chassis, the drawer being constructed to slide between an open position and a closed position relative to the chassis;
    c) a sliding radius limiter located adjacent to one side of the drawer;
    d) a stationary radius limiting structure including an arcuate body having a stepped construction that mounts to a shoulder formed in the drawer; and
    e) bulkhead adapter plates mounted in a face panel of the drawer, the bulkhead adapter plates including angled adapters having a first end accessible from an exterior of the drawer and a second end located within an interior of the drawer, the bulkhead adapter plates being formed by a series of bending operations that provides a predetermined flatness characteristic.

* * * * *